Dec. 21, 1954     H. W. WHITBY     2,697,579
MOUNTING STRUCTURE FOR CAPACITORS OR THE LIKE
Filed June 29, 1950
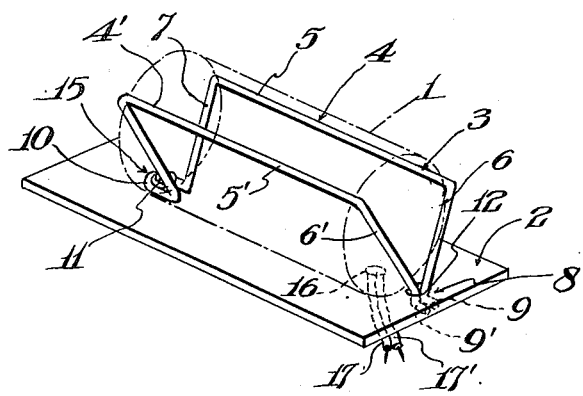
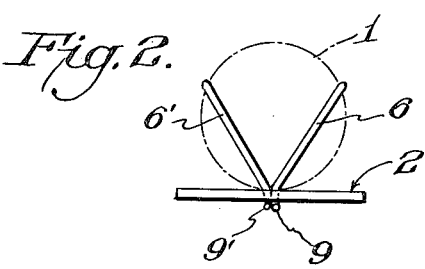
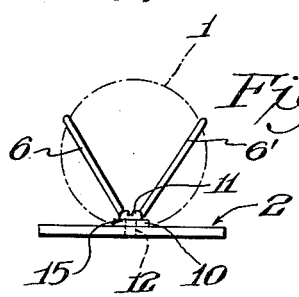
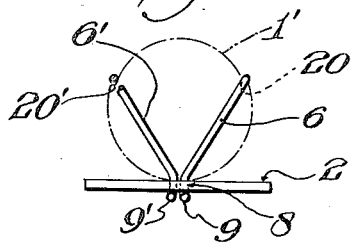
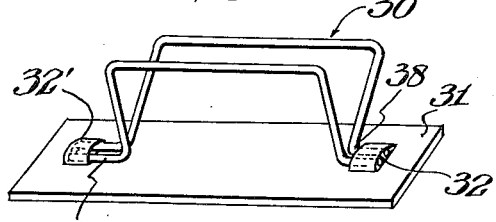
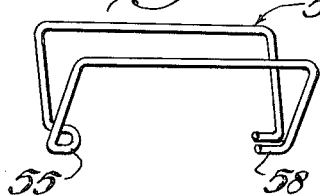
INVENTOR
H. W. WHITBY
BY
Arthur G. Connolly
ATTORNEY 2,697,579
Patented Dec. 21, 1954

United States Patent Office

2,697,579

MOUNTING STRUCTURE FOR CAPACITORS OR THE LIKE

Harvie W. Whitby, Dayton, Ohio, assignor to Sprague Electric Company, North Adams, Mass., a corporation of Massachusetts Application June 29, 1950, Serial No. 171,021

1 Claim. (Cl. 248—361)

The present invention relates to mounting structure for securing to a mounting base devices such as cylindrical objects, and more particularly refers to mounting structure for resiliently securing electric capacitors to single phase capacitor motors and capacitor-start motors.

In the assembly of single phase capacitor type motors it is necessary to provide mounting structure for the attachment of a capacitor generally of the electrolytic variety. This structure should be inexpensive, easily mounted, sturdy, as well as arranged to readily receive the capacitor so that for commercial production the capacitor can be inserted with a minimum of labor and time. The structure must also provide for the adequate dissipation of heat from the capacitor as well as from heat-generating equipment such as a motor, on which the capacitor is to be held.

It is an object of this invention to provide an easily produced, inexpensive capacitor mounting structure of novel construction. Another object is to produce a readily affixed capacitor mounting structure. A further object is to produce an improved lightweight, sturdy capacitor mounting structure by which a capacitor can be easily snapped into place. Other objects of the invention will be apparent from the description and claim that follow.

These objects are attained in accordance with the present invention wherein there is produced mounting structure for securing a generally cylindrical capacitor to a motor base, said structure comprising a continuous stiff wire element bent into the shape of two connected, opposed elongated capacitor clamping arms each having an elongated center section extending the length of the capacitor and legs projecting angularly from each end of said center section, said projecting legs terminating in hooked anchoring elements for securing the mounting structure on the base. The invention is further concerned with the above disclosed mounting structure wherein each of the elongated center sections of said clamping arms extends the length of the capacitor casing and legs project angularly from each end of said center sections for preventing the longitudinal movement of a capacitor engaged by said clamp. It is preferred that the angle between the arms be greater than about 10° and less than 90°. The legs should be positioned so that the clamp will resiliently restrain any capacitor motion once the capacitor is placed within the clamp arms.

In one of its limited and preferred forms, the free ends of said continuous stiff wire are both at the same end of the respective arms and form one of the anchoring elements, and the portion of the wire connecting the legs at the other end of the arms forms the remaining hooked element, this connecting portion being looped for the insertion of a fastening bolt to engage the element to the motor housing or other mounting base to which the clamp is to be secured.

The invention will be described in greater detail with reference to the appended drawings wherein Fig. 1 is a perspective view showing the clamp attached to a capacitor mounting base;

Fig. 2 shows an end view of the clamp and its relation to the mounting base;

Fig. 3 shows an end view of the other end of the clamp illustrated in Figs. 1 and 2;

Fig. 4 shows an end view of the clamp and a capacitor provided with special grooves for cooperation with the clamp; and Fig. 5 shows diagrammatically an alternative arrangement for securing the clamp to a mounting base.

The mounting structure shown in Figs. 1, 2 and 3 illustrates the attachment of a generally cylindrical electric capacitor 1 to a mounting base 2, such as a motor housing. The mounting structure comprises a continuous stiff wire element 3 bent into the shape of two connected, opposed elongated capacitor clamping arms 4, 4' for resiliently engaging capacitor 1, each arm 4, 4' has an elongated center section 5, 5' respectively, extending the length of the capacitor, and legs 6, 7 and 6', 7' projecting angularly from each end of the respective center sections 5, 5' for preventing the longitudinal movement of the clamped capacitor. The angularly disposed legs 6, 6' terminate in a hooked anchoring element 8 comprising the two terminal ends 9, 9' of the wire element 3. The angularly disposed legs 7, 7' are connected by hooked anchor 15, which includes a loop 10 for the insertion of a fastening bolt 11 that secures the clamp to base 2. Anchoring element 8 may be inserted in a hole 12 provided in mounting base 2 as more clearly shown in Fig. 2. Thus the entire clamp is secured to the mounting base by means of but one fastener. When the clamp is fastened in place, the capacitor can be readily snapped into position between arms so that the clamp resiliently but securely engages the capacitor without significantly impairing the dissipation of heat from the base 2 or the capacitor. Furthermore, the mounting of the capacitor requires no tools, careful positioning or handling and can be completed in a minimum of time. The capacitor may have its terminal leads 17, 17 extending through an aperture 16 in the base 2, from the generally cylindrical outer surface of the capacitor adjacent one of its ends. A capacitor whose exterior is a hard molded resinous casing makes a highly suitable construction resistant to damage by the clamping forces applied by arms 4, 4'.

Fig. 4 shows the same view of the capacitor clamp shown in Fig. 2, but with part of one arm broken away. Here, capacitor 1' is provided with longitudinal grooves 20, 20' for engaging the center sections 5, 5' of clamping arms 4, 4' so as to prevent the rotation of capacitor 1'. The grooves or ledges 20, 20' are shaped and positioned to have very little effect on the simple insertion of the capacitor within the clamp, but they can be used to substantially prevent the removal of the capacitor without the previous spreading of the arms. For this purpose each ledge is provided with a floor that is in approximately the same plane as the other floor.

The capacitor clamp of the invention may be secured to the mounting base in manners other than that illustrated. As diagrammatically illustrated in Fig. 5 a mounting base 31 is provided with preferably integral housing portions 32, 32' for snugly receiving anchoring portions 33, 35 of wire element 30 bent in the form of the illustrated capacitor clamp. The capacitor clamp is firmly held by housings 32, 32', into which the hooked ends 33, 38 can be readily inserted as by yieldably urging them toward each other. At the same time the capacitor is also readily insertable into the clamp.

The capacitor clamp shown in Fig. 7 has two capacitor clamping arms 84, 84' for resiliently engaging the capacitor. It should be noted that arms 84, 84' are, in this instance, not parallel, but are diverging. Legs 86, 86' and 87, 87' extend angularly from the ends of each arm as shown. These legs terminate in hooked anchoring elements 8 and 85 respectively. Hooked element 8 comprises the two terminal elements 89, 89' of the wire from which the clamp was bent. Hooked element 85 is in the form of a loop 80 at about the center of the wire. Excellent clamping action is obtained by means of this modification of the invention.

To insure better gripping, teeth or some other projections may be formed on the wire of the clamping structure. These teeth would serve to prevent the capacitor from rotating in the clamp. Teeth may be formed in the wire element of the clamp by running it through a set of knurling rollers. The hooked anchor elements of the clamp may be pointed in a direction other than that shown in Fig. 1. For example, they may be directed inwardly as shown by the hooked anchoring elements 55, 58 of clamp 50 in Fig. 6. Alternatively one or the other of the hooked anchoring elements 55, 58 may be inwardly turned while the remaining element may be outwardly turned.

Although the invention has been illustrated with reference to a capacitor mounting structure for securing an electric capacitor to a motor housing, the invention can also be used to hold power-factor correcting or other types of capacitors or similar articles to other devices. For instance, the invention may be used to secure any type of cylindrical object, such as a can-type container to a suitable mounting base.

As many apparently widely different embodiments of this invention may be made without departing from the spirit and scope hereof, it is to be understood that the invention is not limited to the specific embodiments hereof except as defined in the appended claim.

What is claimed is:

A mounting structure for securing a generally cylindrical electrical unit, comprising a continuous stiff wire element bent into the shape of two connected opposed elongated clamping arms for resiliently engaging an electrical unit, each arm having an elongated center section extending the length of said element for holding said electrical element in position, and legs projecting angularly from each end of said center section for preventing the longitudinal movement of said electrical element, the two adjacent legs at one end of said structure converging together and being joined into a loop section for attachment to an appropriate base by a bolt type fastening element, and the adjacent legs at the other end of said structure converging together and being provided with two short terminations bent substantially parallel to said elongated center sections for insertion in an aperture in said base and providing interlocking engagement with the under surface of the base, said wire being provided with projections for preventing said electrical element from moving within said clamping structure.

References Cited in the file of this patent

UNITED STATES PATENTS

| Number | Name | Date |
|---|---|---|
| 224,825 | Hatch | Feb. 24, 1880 |
| 430,531 | Loring | June 17, 1890 |
| 559,758 | Stanton | May 5, 1896 |
| 846,758 | Pike | Mar. 12, 1907 |
| 1,099,034 | Girard | June 2, 1914 |
| 2,051,480 | Hoge | Aug. 18, 1936 |
| 2,084,162 | Packard | June 15, 1937 |